US005732409A

United States Patent [19]
Ni

[11] Patent Number: 5,732,409
[45] Date of Patent: Mar. 24, 1998

[54] CACHING DISK CONTROLLER IMPLEMENTED BY HARDWIRED LOGIC

[75] Inventor: Guang-nan Ni, Road Town, Virgin Islands (Br.)

[73] Assignee: Legend Research Limited, Tortola, Virgin Islands (Br.)

[21] Appl. No.: 813,013

[22] Filed: Mar. 5, 1997

Related U.S. Application Data

[63] Continuation of Ser. No. 215,217, Mar. 21, 1994, abandoned.

[51] Int. Cl.$^6$ .................................................. G06F 12/08
[52] U.S. Cl. ........................ 711/113; 711/3; 711/142; 711/143; 711/202
[58] Field of Search .......................... 711/113, 3, 142, 711/143, 202, 114, 128, 133, 136, 144, 145, 146, 203–209

[56] References Cited

U.S. PATENT DOCUMENTS

| | | | |
|---|---|---|---|
| 4,598,357 | 7/1986 | Swenson et al. | 395/440 |
| 4,638,426 | 1/1987 | Chang et al. | 395/421.06 |
| 4,758,946 | 7/1988 | Shar et al. | 395/416 |
| 4,794,523 | 12/1988 | Adan et al. | 395/250 |
| 4,884,197 | 11/1989 | Sachs et al. | 395/450 |
| 4,920,478 | 4/1990 | Furuya et al. | 395/463 |
| 4,985,829 | 1/1991 | Thatte et al. | 395/417 |
| 5,006,980 | 4/1991 | Sanders et al. | 395/375 |
| 5,133,060 | 7/1992 | Weber et al. | 395/440 |
| 5,386,527 | 1/1995 | Bosshart | 395/403 |
| 5,404,483 | 4/1995 | Stamm et al. | 395/471 |
| 5,442,571 | 8/1995 | Sites | 395/403 |
| 5,535,405 | 7/1996 | Buyers et al. | 395/800 |

OTHER PUBLICATIONS

Hong et al., Design of on-chip caches for RISC processors, Journal of the Korean Institute of Telematics and Electronics, vol. 27, No. 8, pp. 1201–1210, Aug. 90.

Elphick et al., Operating systems meet real-time chanllenge, ESD: The Electronics System Design Magazine, v19, n3, p. 30(5), Mar. 89.

Cates et al., RISC cores for caching and hard disk controllers, Wescon Conference Record v. 34, Published by Western Periodicals Co., abstract, 1990.

Computer System Architecture, M. Morris Mano, 3rd Ed., 1993, pp. 462–469.

L. Brett Glass, "Hands on Under the Hood", Oct. 1989, pp. 299–301.

PC Magazine, "Caching Controllers: Hard Disk Access In No Time Flat", Jun. 12, 1990, pp. 153–156, 159, 161–162, 169–170, 173–176, and 180.

*Primary Examiner*—Matthew M. Kim
*Attorney, Agent, or Firm*—Kenyon & Kenyon

[57] ABSTRACT

A disk accelerator being a new design for caching disk controller includes caching disk control unit which contains an address mapper therein, which is a pure hardware logic. The address mapper maps the disk location parameters being accessed into an effective address. A cache memory and a tag memory contained in the disk accelerator are similar to that of normal memory caches, except that the effective address and sector(s) are used as memory address and memory word(s) respectively. The disk accelerator can provide real time response on cache hit or miss, and can also eliminate the overhead for manipulating buffer. The disk accelerator can be implemented by a single VLSI chip with a sizable memory constitutes of SIMMs or DRAM chips or other memory chips.

12 Claims, 4 Drawing Sheets

CACHING DISK CONTROLLER IMPLEMENTED BY HARDWIRED LOGIC

This is a continuation of application Ser. No. 08/215,217, filed Mar. 21, 1994, now abandoned.

BACKGROUND OF THE INVENTION

This invention relates to a caching disk controlling system. In particular it relates to a caching disk controller design for making response on cache hit or miss in real time.

In the prior art, the caching disk controller is a module composed of hardware and software to improve disk performance by using cache technology. As depicted in FIG. 1, the controller is disposed between the computer system and the disk. It communicates with disk via some sort of device bus. By performing the disk cache function it can improve the overall performance of the disk system.

The approach of the disk cache is shown in FIG. 2. Disk caching works essentially the same whether there is a cache on the disk controller or there is a software-based solution. The central processing unit (CPU) requests specific data from the cache. In some cases, the information will already be there, and the request can be filled without accessing the hard disk. If the requested information is not in the cache, the data is read from the disk along with a large portion of the adjacent information. The cache then makes room for the new data by replacing the old. Depending on the algorithm, this may be the cache's oldest (first loaded) or the least used information. The CPU's request can then be fulfilled, and the cache already has the adjacent data loaded in anticipation of a request for that information.

According to the procedure shown in FIG. 2: step 1 is that the CPU requests new data; step 2—data is not found in cache and cache requests data from hard disk; step 3—cache reads data from multiple sectors on disk, including data adjacent to that requested; step 4—cache replaces old data with new data; and step 5—cache supplies CPU with requested data.

There are two basic design: a caching disk controller, which takes a hardware approach; and a disk caching program, which is a software solution.

The caching disk controllers contain CPU chips of their own, along with a sizable chunk of memory. The memory is managed by the controller's own processor. The idea behind the extra processor is to relieve the burden on the computer's CPU so that it can devote its efforts toward executing program instructions.

The alternative design for a disk cache is to use software that sets aside a section of extra memory, either expanded or extended, for use as a disk cache. This functions the same way as the caching disk controller, except for two differences. On the down-side, it requires the system CPU to handle all the cache management tasks, adding to the processor's burden and slowing its performance. On the other hand, if the memory in use is located on the motherboard, it's not restricted by slow bus speeds.

The shortcomings of current caching disk controllers:

1. Complexity. The caching disk controller must have its own processor to manipulate the disk cache functions under the control of the firmware. Therefore the caching disk controller is essentially a rather complicated computer system.

2. Overhead. There is overhead involved in current caching disk controllers. One component is the overhead in determining whether the data requested by the system, in which the controller is installed, is a hit or not. For every request from the system the processor in the controller must check the content already loaded in its memory to see if one of them matches the request. The detail processing will vary depending on the associative scheme and other factors of the cache. Even if the request is a hit there is still some delay introduced. Another overhead component relates to the manipulation of the memory. For a read request if the data requested is not in the controller's memory, the processor must read data from disk and not only sends data to the system but also updates its memory by replacing old data with the new data. For a write request the operation required will vary depending on the particular caching scheme, write through or write back for instance. In both cases the processor must spend time to manipulate its memory accordingly.

3. Slow transfer speed. In old bus architecture, industry standard architecture (ISA) or extended industry standard architecture (EISA) for instance, the performance of a caching disk controller is limited by slow bus speed.

SUMMARY OF THE INVENTION

Accordingly, the present invention provides a new design for caching disk controllers, which adopts the Memory Cache architecture to the coaching disk controller.

This invention also provides a pure hardware design for simplifying the cache disk controller.

This invention also provides a caching disk controller carrying out all cache related operations with a controller hardware in real time.

According to the invention a new design for caching disk controller comprises:

a device interface for interfacing a caching disk control unit with at least one disk drive being cached, a system interface for interfacing said caching disk control unit with a computer system, said caching disk control unit being a hardwired logic for performing all control functions of said caching disk controller, an address mapper as a module contained in said control unit for converting a disk location parameter into an effective addresses of the disk being accessed in real time, a cache consisting of a cache memory and a tag memory, which is connected to said caching disk control unit, in which said cache memory holds recorded sector(s) of the disk being cached, and said tag memory system are indexed by said converted effective addresses.

The disk accelerator adopts the Memory Cache architecture to the caching disk controller. The architecture of memory cache is different from that of disk cache in some aspects as detailed below:

1. The object being cached in a memory cache is a random access memory while that in a disk cache is a sequential access disk drive.

2. The content of a memory is accessed by its address while that of disk drives is accessed by its location parameters, e.g., the particular number of drive, cylinder, head and sector, etc.

3. The minimum access unit of a memory is a word while that of disk drives is a sector, which contains many bytes (512 bytes in many cases for instance), or multi sectors.

Special hardware is required to allow the memory cache architecture to be used in a caching disk controller.

DETAILED DESCRIPTION

Figure 1:
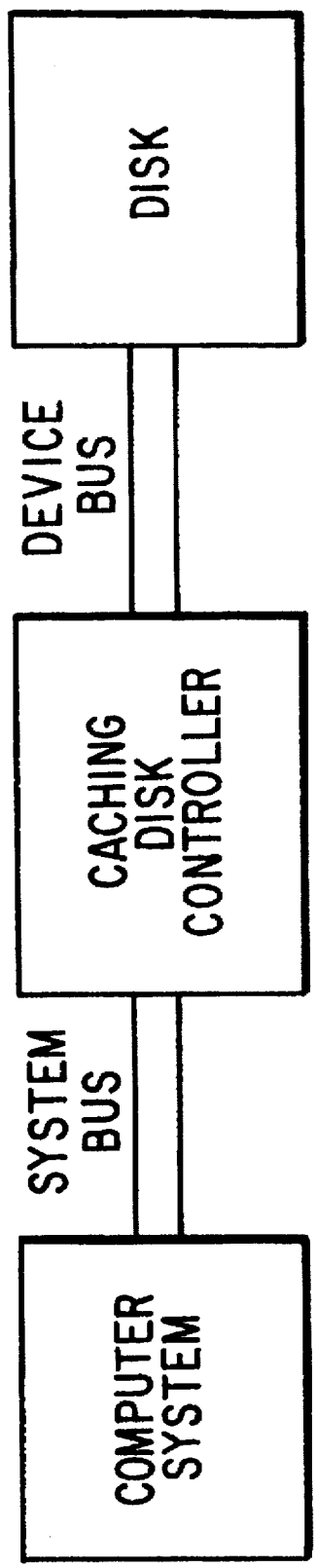
FIG. 1 is a block diagram showing a caching disk controller.
Figure 2:
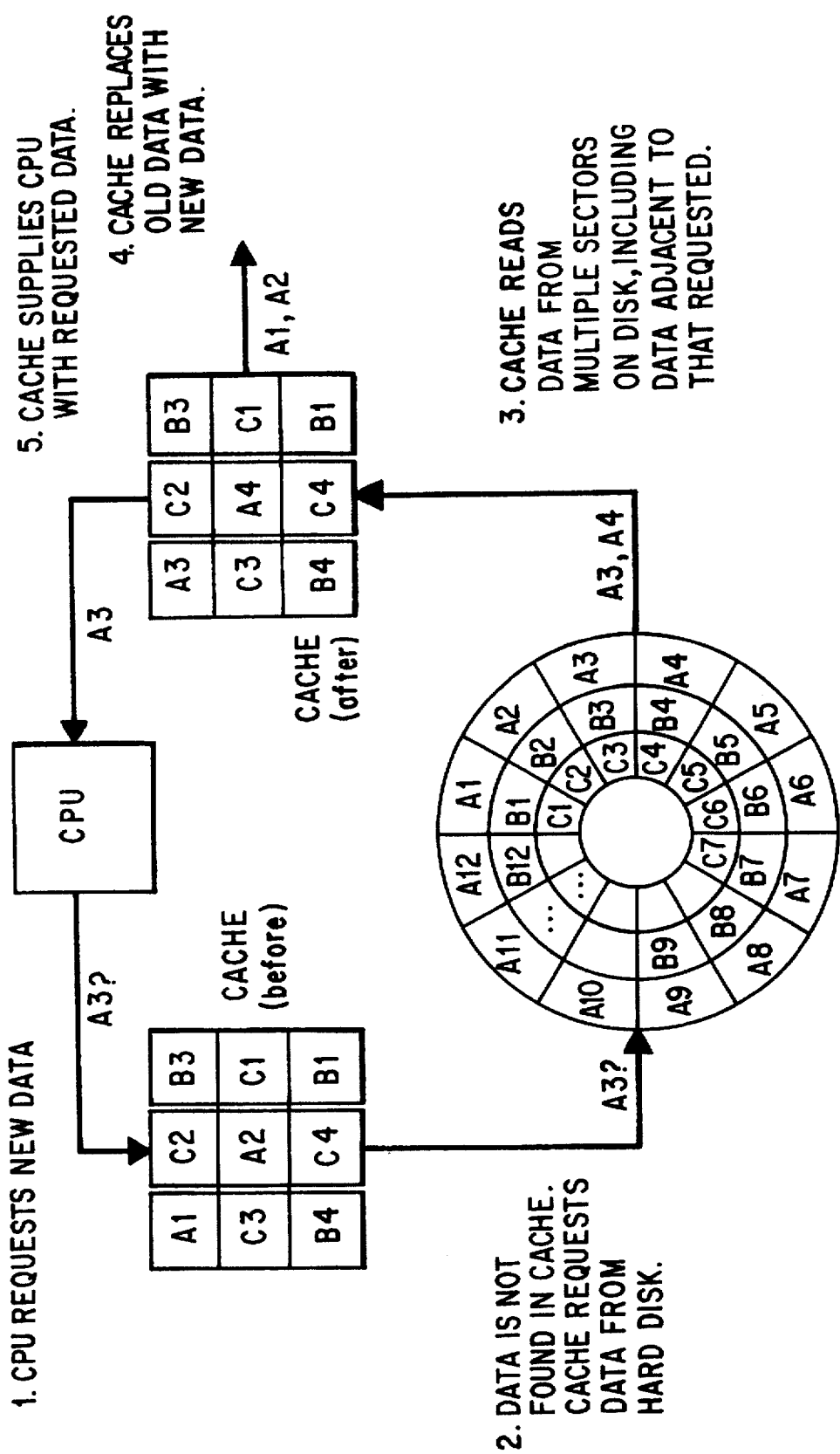
FIG. 2 is a block diagram showing the principle of a disk cache.
Figure 3:
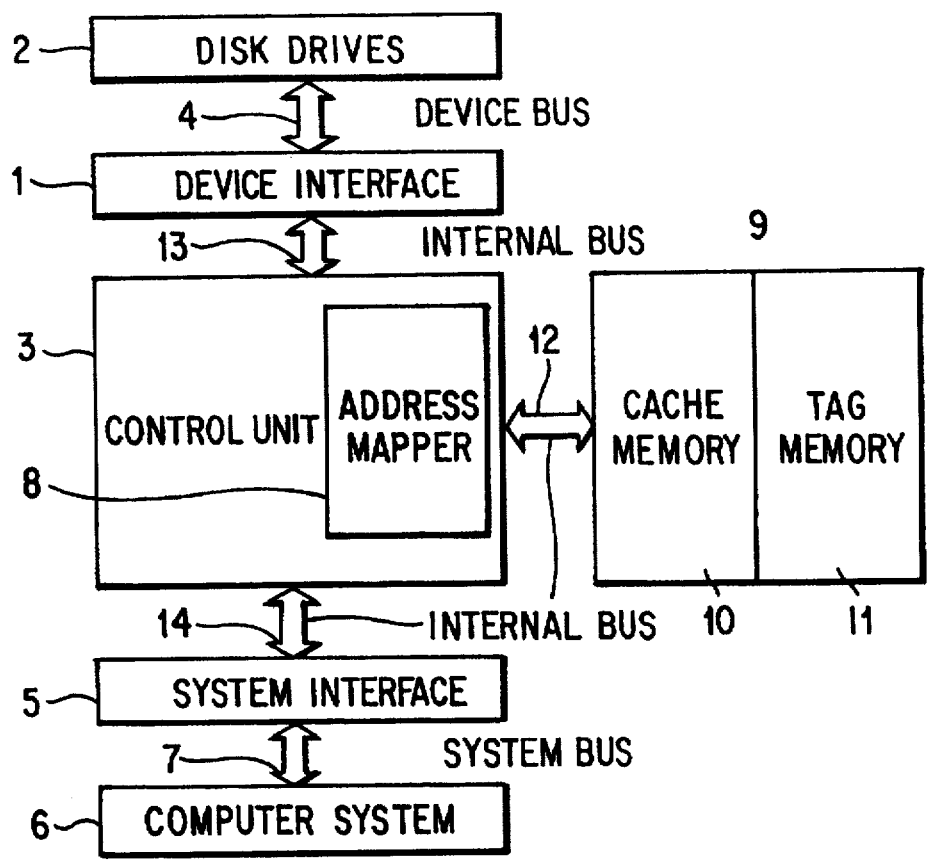
FIG. 3 is a block diagram showing a caching disk controller.

This invention provides a new design for a caching disk controller as shown in FIG. 3.

A device interface 1 interfaces a caching disk control unit 3 with at least one disk drive 2 being cached. A device bus 4 connected between the disk drives 2 and the device interface 1 can be integrated device electronics (IDE) interface or small computer systems interface (SCSI) interface or other disk interface. Multiple disk drives 2 may share the same caching control unit 3.

A system interface 5 interfaces the caching control unit 3 with a computer system 6 through a system bus 7, which can be videoelectronic standards association (VESA) local bus, peripheral component interface (PCI) bus or other system bus in which the caching disk controller is installed.

The caching disk control unit 3 is a hardwired logic and performs all necessary controls for the caching disk controller.

An address mapper 8 is an important module contained in the control unit 3. It maps the disk location being accessed into an effective address in real time. By using the address mapper 8 the access to a disk 2 can be treated as access to a random access memory.

A cache 9 consists of a cache memory 10 and a tag memory 11, and is connected to the caching disk control unit 3 through an internal bus 12, the cache memory 10 holds the recorded sector(s) of the disk being cached.

There are two internal buses 13, 14, one (13) connected between the control unit 3 and the device interface 1, and the other (14) is connected between the control unit and system interface 5. The internal buses 12, 13 and 14 connect all functional blocks to form an integral caching disk controller.

The address mapper 8 with the control unit 3 provides a one-to-one map from the disk access location parameters to an effective address. Usually any access to the disk 2 is specified by the location parameters such as the particular number of drive, cylinder, head and sectors respectively. The address mapper 8 will map this location into an effective address based on the particular structure of the disk 2. Any kind of one-to-one mapping function can be used. One possible mapping function is to convert the location into the number of a physical sector of the disk 2.

Figure 4:
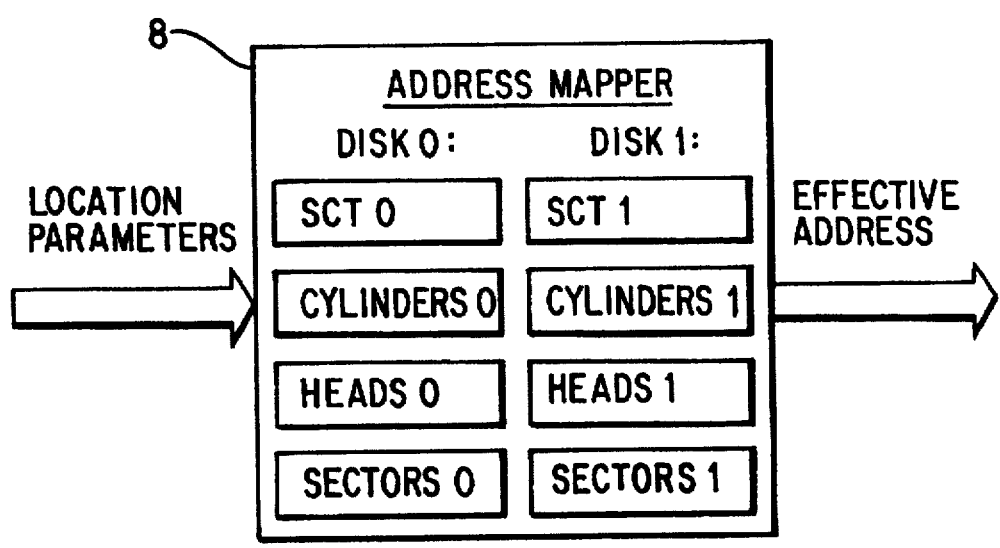
FIG. 4 is a block diagram showing an address mapper.

The address mapper 8 is hardwired logic that contains registers to store the disk structure parameters. As depicted in FIG. 4, a typical address mapper 8 for two disk drives 2 has two register files, one for each disk drive 2 respectively. The structure parameters for drive N normally are the total cylinders per drive (cylindersN), the total heads per cylinder (headsN), the total sectors per head (sectorsN) and a constant (sctN). They are drive specific and can be loaded after power on. If more drives should be handled, more register files should also be added. Although any one-to-one function can be used to map the location parameters into an effective address, the most straightforward mapping is to convert them into the number of physical sectors. Given the access location as no_drv, no_cyl, no_hd and no_sct, which stand for the particular number of drive, cylinder head and sector being accessed respectively, the effective address can be calculated as:

Effective address=
  Total sectors+
  +no_cyl*headsN*sectorsN+
  +no_hd*sectorsN+no_sct+sctN Where, Total_sectors=The summation of total physical sectors from drive 0 to N−1.

If no_drv=0, Total sectors=0.

If no_drv=1, Total_sectors= cylinders0*heads0*sectors0+set0.

The above calculation can be performed by hardware, an ALU or a look-up table for instance, in real time. Using modern design tools, hardware for implementing this function can be easily designed. As mentioned above, other mapping functions are also allowed.

Once the location parameter has been converted to an effective address, the cache relating operations of a disk cache will be similar to that of memory caches. In other words, the effective address converted from the location parameters will be treated as a memory address and the recorded sector(s) of the disk will be treated as memory word(s).

The cache 9 will then function very much like a memory cache, e.g. responds to read or write access, determines cache hit or miss, performs cache line refill, cache line invalidate and write through or write back, etc.

The functions of the control unit 3 are as follows:

1. Buffers and analyzes the commands issued from system bus 7.
2. Manipulating the commands accordingly.
3. For disk read and write commands determines cache hit or miss based on the effective address converted by the address mapper 8.
4. Manipulating the cache memory 10 and tag memory 11 according to the cache scheme used, e.g., direct mapping or set associative, write through or write back, etc. Meanwhile accesses the disk drive 2 when necessary. 5. For multi sectors read and write commands the control unit 3 should be able to divide the multiple sectors being accessed into some sub-groups. Each sub-group consists of consecutive sectors that are either all hit or all miss. A sub-group may consist of as few as one sector. Then the control unit 3 will treat each sub-group sequentially.

Figure 5:
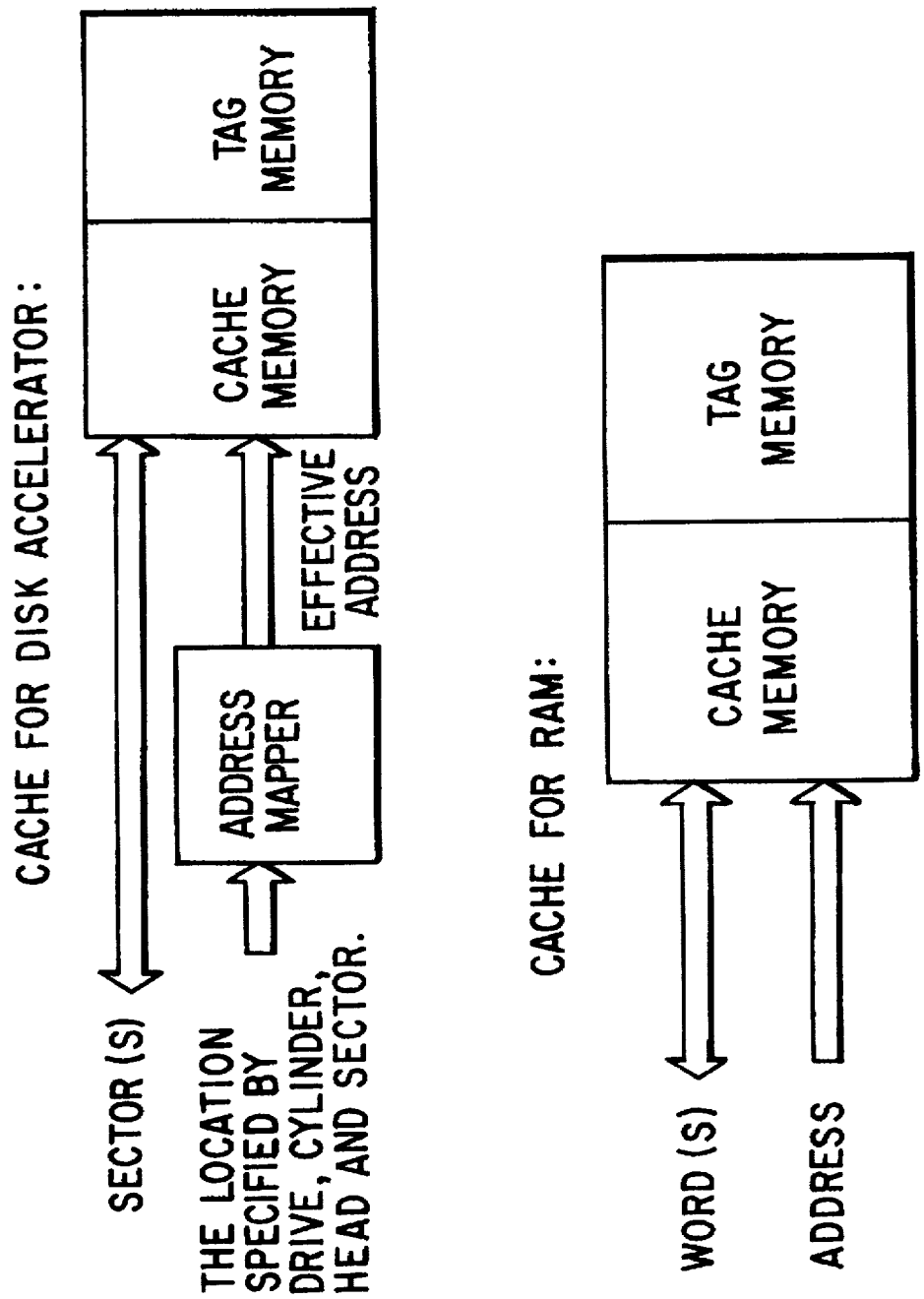
FIG. 5 is a block diagram showing the comparison of cache used for a caching disk controller and for RAM.

The cache for a caching disk controller is different from that used for a random access memory (RAM). FIG. 5 gives a comparison between the cache used for a caching disk controller and that used for RAM. The address and refill line for the two caches are treated differently. Following Table summarizes their differences.

| | | SUBSTITUTE SPECIFICATION |
|---|---|---|
| | Cache for RAM | Cache for caching disk controller |
| Address | RAM Address being accessed. | The location specified by the drive, cylinder, head and sector being accessed is converted to an Effective Address by an Address mapper. |

-continued

| | SUBSTITUTE SPECIFICATION | |
|---|---|---|
| Refill line | RAM word(s) | Disk sector(s), normally a sector contains many bytes (512 bytes for instance). |

The caching disk controller of this invention provides a number of advantages over the current caching disk controllers. They are as follows:

1. Simplicity. The design is a pure hardware design. By using a very large scale integrated circuit (VLSI) technology the whole caching disk controller can be integrated into a single controller chip with a sizable memory outside the chip. The difference between normal disk controller and the caching disk controller will then be diminished. The former can be treated as a special case in which no memory is installed for the controller. Any time you install memory, which may be SIMMs or memory chips depending on particular implementations, it will then be a caching disk controller.

2. Zero overhead. With this caching disk controller design all cache relating operations, such as the determination of hits and misses, the cache line refill, the write through or write back operations, etc., are carried out by the controller hardware in real time. Therefore it eliminates all caching overhead that exists in current caching disk controllers using a processor and firmware.

What is claimed is:

1. A caching disk controller comprising:
   a caching disk control unit having an address mapper module and hardwired logic, said hardwired logic being provided for all control functions of said caching disk control unit, said control functions including the functions of determining cache hits and misses, carrying out cache refill, write through, posted write, write back and cache line invalidate operations, and converting disk location parameters into effective addresses, said address mapper module including a plurality of registers;
   at least one disk drive;
   a computer system;
   a device interface between said caching disk control unit and said at least one disk drive;
   a system interface between said caching disk control unit and said computer system; and
   a cache connected to said caching disk control unit, said cache including a cache memory and a tag memory, wherein said cache memory holds recorded sectors of a disk being cached, and said tag memory is indexed by said converted effective addresses to access tag information.

2. The caching disk controller according to claim 1, wherein said caching disk control unit comprises a single Very Large Scale Integrated circuit chip.

3. The caching disk controller according to claim 1, further comprising a device bus connected between said disk to be accessed and said device interface, said device bus comprising an Integrated Device Electronics interface.

4. The caching disk controller according to claim 1, wherein said system interface is coupled to said computer system by a system bus, said system bus comprising a Video Electronics Standards Association local bus.

5. The caching disk controller according to claim 1, wherein said cache memory and tag memory are configured as a direct mapping cache.

6. The caching disk controller according to claim 1, any one-to-one mapping function can be used including one that converts the location parameters into the number of physical sectors.

7. The caching disk controller according to claim 1, wherein said functions of determining cache hits and misses are carried out by said hardwired logic of said caching disk control unit in real time.

8. The caching disk controller according to claim 1, wherein said functions of determining cache hits and misses and carrying out cache line refill, write through, posted write, write back, and cache line invalidate operations are all carried out by said hardwired logic of said caching disk control unit in real time.

9. The caching disk controller according to claim 1, wherein said disk controller can be treated as a normal disk controller when said cache is not installed therewith.

10. The caching disk controller of claim 1, further comprising a device bus connected between said disk to be accessed and said device interface, said device bus comprising a Small Computer Systems Interface.

11. The caching disk controller of claim 1, wherein said system interface is coupled to said computer system by a system bus, said system bus comprising a Peripheral Component Interconnect local bus.

12. The caching disk controller of claim 1, wherein said cache memory and tag memory can be configured as a set associative cache.

* * * * *